(12) United States Patent
Gaddehosur et al.

(10) Patent No.: US 10,476,841 B2
(45) Date of Patent: Nov. 12, 2019

(54) STATELESS TUNNELS

(71) Applicant: Microsoft Technology Licensing, LLC, Redmond, WA (US)

(72) Inventors: Poornananda R. Gaddehosur, Redmond, WA (US); Alan Thomas Gavin Jowett, Monroe, WA (US); Anurag Saxena, Bellevue, WA (US); Sravanth Bangari, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 48 days.

(21) Appl. No.: 15/934,540

(22) Filed: Mar. 23, 2018

(65) Prior Publication Data
US 2019/0297053 A1    Sep. 26, 2019

(51) Int. Cl.
*H04L 29/12* (2006.01)
*H04L 12/46* (2006.01)

(52) U.S. Cl.
CPC ...... *H04L 61/2592* (2013.01); *H04L 12/4633* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 8,374,183 B2 | 2/2013 | Alkhatib et al. | |
| 9,042,384 B2 | 5/2015 | Sridharan et al. | |
| 9,294,524 B2 | 3/2016 | Raman | |
| 9,961,104 B2* | 5/2018 | Kruglick | H04L 63/1441 |
| 2011/0283017 A1 | 11/2011 | Alkhatib et al. | |
| 2013/0031233 A1* | 1/2013 | Feng | G06F 9/06 709/223 |
| 2013/0058346 A1 | 3/2013 | Sridharan et al. | |

(Continued)

OTHER PUBLICATIONS

"Hyper-V Network Virtualization Technical Details in Windows Server Technical Preview", Retrieved from<<https://technet.microsoft.com/en-us/library/mt238303.aspx>>, Aug. 14, 2015, 12 Pages.

(Continued)

*Primary Examiner* — Hong S Cho
(74) *Attorney, Agent, or Firm* — Holzer Patel Drennan

(57) ABSTRACT

A method of tunneling a data packet through a network communicatively coupled to a datacenter is provided. The datacenter is uniquely addressed within the network. The datacenter has a different internal address space than the network. Transformation rules are recorded for a programmable packet filter in the datacenter. The data packet is received in the programmable packet filter of a host computing device in the datacenter. The received data packet is converted in the programmable packet filter of the host computing device between a stateless tunneling data packet and a datacenter data packet according to the recorded transformation rules. The datacenter data packet is uniquely addressed within the internal address space of the datacenter. The received data packet bypasses any virtual machine processing in the host computing device during the converting. The converted data packet is transmitted from the programmable packet filter in the datacenter.

20 Claims, 8 Drawing Sheets

(56) References Cited

U.S. PATENT DOCUMENTS

| | | | |
|---|---|---|---|
| 2015/0263865 A1* | 9/2015 | Rangarajan | H04L 12/4633 370/254 |
| 2015/0381494 A1 | 12/2015 | Cherian et al. | |
| 2016/0285706 A1* | 9/2016 | Rao | H04L 43/028 |

OTHER PUBLICATIONS

=Firestone, Daniel, "VFP: A Virtual Switch Platform for Host SDN in the Public Cloud", In Proceedings of 14th USENIX Symposium on Networked Systems Design and Implementation, Mar. 27, 2017, pp. 315-328.

Koponen, et al., "Network Virtualization in Multi-tenant Datacenters", In Proceedings of 11th USENIX Symposium on Networked Systems Design and Implementation, Apr. 2, 2014, pp. 203-216.

Liu, et al., "M2cloud: Software Defined Multi-site Data Center Network Control Framework for Multi-tenant", In Proceedings of ACM SIGCOMM Conference on SIGCOMM, Aug. 12, 2013, pp. 517-518.

Mysore, et al., "FasTrak: Enabling Express Lanes in Multi-Tenant Data Centers", In Proceedings of Ninth ACM Conference on Emerging Networking Experiments and Technologies, Dec. 9, 2013, 12 Pages.

"International Search Report and Written Opinion Issued in PCT Application No. PCT/US2019/022165", dated May 29, 2019, 14 Pages.

\* cited by examiner

STATELESS TUNNELS

BACKGROUND

Virtualized networks contained within datacenter are connected to public networks, such as the Internet, through gateway devices. The gateway devices typically encapsulate (tunnel) or translate (transform) data packets from within a tenant network to a destination. Connectivity is provided by stateful methods, such as IPSec-based encapsulation and encryption, or stateless methods, such as Generic Routing Encapsulation (GRE) or virtual LAN (VLAN) tagging. As demand for traffic exchanged through such a tunnel increases, the gateway device itself becomes single tunneling endpoint, and therefore, a traffic bottleneck and a single point of failure.

SUMMARY

The described technology addresses one or more of the foregoing problems by providing tunneling of a data packet through a network communicatively connected to a datacenter. The datacenter is uniquely addressed within the network. The datacenter has a different internal address space than the network. Transformation rules are recorded for a programmable packet filter in the datacenter. The data packet is received in the programmable packet filter of a host computing device in the datacenter. The received data packet is converted in the programmable packet filter of the host computing device between a stateless tunneling data packet and a datacenter data packet according to the recorded transformation rules. The datacenter data packet is uniquely addressed within the internal address space of the datacenter. The received data packet bypasses any virtual machine processing in the host computing device during the converting. The converted data packet is transmitted from the programmable packet filter in the datacenter.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
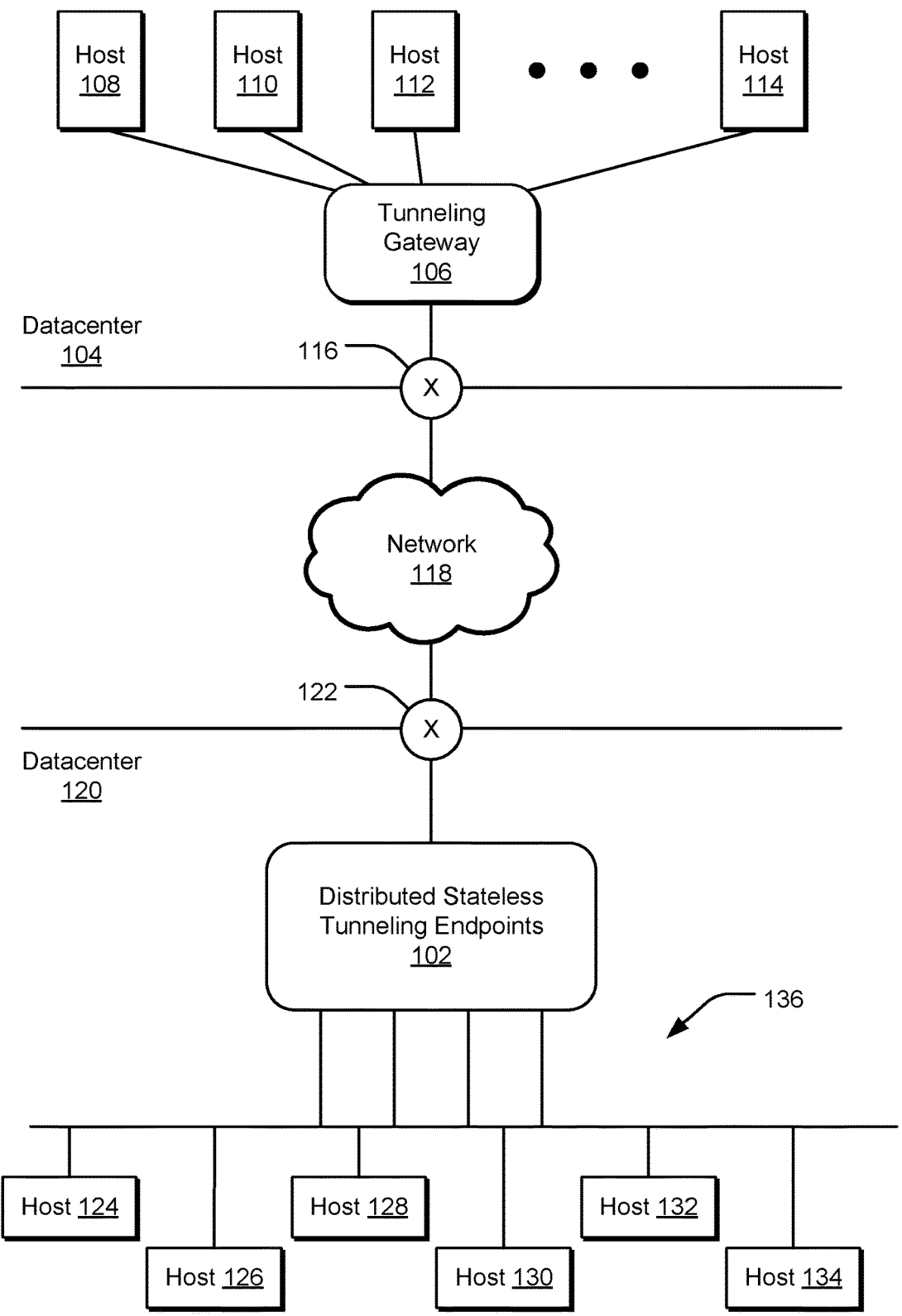
FIG. 1 illustrates an example system including distributed stateless tunneling endpoints.

FIG. 1 illustrates an example system 100 including distributed stateless tunneling endpoints 102. The system 100 includes a datacenter 104 that includes without limitation a tunneling gateway 106 and hosts 108, 110, 112, and 114. which represent host processes within the datacenter 104. Such host processes may execute within a virtual machine on one or more host computing devices within the datacenter 104. A virtual machine is an emulation of a computer system and is typically isolated from the operating system kernel of a host computing device. Virtual machines are based on various computer architectures and provide virtual machine processing providing the functionality of a separate physical computer within the host computing device. The interaction between the virtual machine and the operating system and resources of the host computing devices can be managed by a thin layer of software called a "hypervisor" that decouples the virtual machine from the host and dynamically allocates computing resources to each virtual machine as needed. Virtual machine implementations may involve specialized hardware, software, or a combination.

The datacenter 104 can transmit and receive data packets across a network 118 to and from host processes (such as hosts 124, 126, 128, 130, 132, and 134) within the datacenter 120 using a stateless tunneling protocol, such as GRE (generic routing encapsulation) or L3 routing. On ingress to the datacenter 120, the stateless tunneling data packets are converted in the datacenter 120 to datacenter data packets addressed to the host processes within the datacenter 120. Such host processes may execute on one or more host computing devices within the datacenter 120. On egress from the datacenter 120, datacenter data packets from the datacenter 120 are converted to stateless tunneling data packets addressed to other datacenters on the network 118.

In one implementation, each stateless tunneling data packet includes an "outer" address pair (e.g., a Provider Address pair) in a network address space of the network, a stateless tunneling key (e.g., a GRE key or a VLAN tag), and an "inner" address pair (e.g., a Customer Address pair) within an internal address space of the datacenter. In an example, the network is a public network with a public network address space, although a leased line or another non-public network may be employed. Likewise, in an example, the datacenter may implement a virtual network with an internal virtual network address space that is different than the address space of the "outer" network, although alternative datacenters may be implemented using technologies other than virtual networking and employ an alternative internal ad/or isolated domain network address space. Each address pair defines a source and a destination. The outer address pair identifies a data packet source associated with the datacenter 104 and a destination within the datacenter 120 that is associated with the distributed stateless tunneling endpoints 102. For example, the outer address can specify a destination IP (internet protocol) address of a multiplexor (not shown in FIG. 1) in the distributed stateless tunneling endpoints 102. The stateless tunneling key identifies the stateless tunnel with which the tunneling data packet is associated, such as by specifying a tunnel index. The inner address pair identifies a source host process within the datacenter 104 and a destination host process within a datacenter network 136 of the datacenter 120. For example, the inner address can be an IP address of a host process (e.g., host 124) in the datacenter network 136.

In contrast, in the datacenter 120, each datacenter data packet includes a datacenter network address pair) and a datacenter network key (e.g., a virtual network key or tag, a virtual network identifier, a datacenter network selector, a tenant network identifier). The address pair identifies the destination and source of the data packet within the datacenter network. The datacenter network key identifies the datacenter network (among multiple datacenter networks or virtual networks potentially supported by a datacenter) to which the datacenter network addresses apply. For example, the virtual network address pair can identify the host process within a virtual network of a datacenter, such as the datacenter network 136 of the datacenter 120. For example, the inner address can be an IP address of a host process (e.g., host 124) in the datacenter network 136.

A programmable packet filter in each distributed stateless tunneling endpoint is configured to convert data packets in either direction between a stateless tunneling data packet and a datacenter data packet, depending on the direction of traffic flow. A programmable packet filter can execute on a different host computing device as the destination or originating host within the datacenter 120 or on the same host computing device as the destination or originating host.

In various implementations, each distributed stateless tunneling endpoint executes a programmable packet filter outside of a virtual machine of any host computing device in the datacenter 120. By bypassing the virtual machine processing of the host computing devices, the conversion operation avoids the processing and resource overhead associated with transitioning from kernel mode processing to virtual machine mode processing and back again. For example, in one implementation, the programmable packet filter executes as software in the kernel of a host computing device in the datacenter. In another implementation, the programmable packet filter is executed in hardware and firmware (or as strictly hardware) in a network interface device of a host computing device. In both implementations, the programmable packet filter bypasses the virtual machine processing of any host computing device in the datacenter 120.

In an ingress path (with respect to a datacenter 120), the tunneling gateway 106 sends tunneling data packets received from the one or more of the host processes 108, 110, 112, and 114 through a switch 116 (such as a top of rack switch or TOR) for the data center 104 into a network 118 addressed to a host process within a datacenter network 136 of the datacenter 120. It should be understood that the tunneling gateway 106 may also be sending tunneling data packets to other datacenters (not shown). The destination host process may be one of the hosts 124, 126, 128, 130, 132, and 134 or other hosts within the distributed stateless tunneling endpoints 102.

In an egress path (with respect to the datacenter 120), a host process of the datacenter 120 transmits datacenter data packets (e.g., virtual network data packets), which are converted into stateless tunneling data packets and sent through the switch 122 into the network 118. In FIG. 1, the egress data packets are received at the switch 116 of the datacenter 104 for processing and routing to an appropriate host within that datacenter.

Tunneling data packet traffic is processed and routed between the hosts in the datacenter 120 and other tunneling endpoints outside the datacenter 120 by one or more programmable packet filters within the distributed stateless tunneling endpoints 102. In the ingress direction, with a stateless tunneling data packet arriving at the switch 122, traversing to the distributed stateless tunneling endpoints 102, and arriving at one of the hosts, a programmable packet filter within the distributed stateless tunneling endpoints 102 receives the data packet and converts it from a stateless tunneling data packet to a datacenter data packet (e.g., a datacenter data packet) uniquely addressed to a host within the datacenter network 136 of the datacenter 120. In the egress direction, with a datacenter data packet (e.g., a datacenter data packet) originating from a host within the datacenter network 136 of the datacenter 120 and addressed to a host outside the datacenter 120, a programmable packet filter of the host computing device of the host converts the datacenter data packet into a stateless tunneling data packet uniquely addressed to a host outside of the datacenter 120 and routes the converted data packet out the switch 122. More details of the ingress and egress paths are provided with regard to FIG. 2.

Software-defined networking is typically characterized by a separation of the control plane of the network, which determines data packet routing within the network (e.g., using transformation and routing rules), and the data plane of the network, which provides the network infrastructure that moves the data packets from node to node within the network. For example, when a data packet arrives at a node, software-defined transformation and/or routing rules stored in the node determined the next destination to which the node will forward the data packet. The data packets are then communicated from the first node to the destination node on the data plane according to the routing determination made by the control plane. By distributing the conversion processing of the control plane among multiple programmable packet filters and applying such software-defined networking techniques, load-balancing and fail-over techniques can be applied to address bottleneck and single-point-of-failure concerns.

Figure 2:
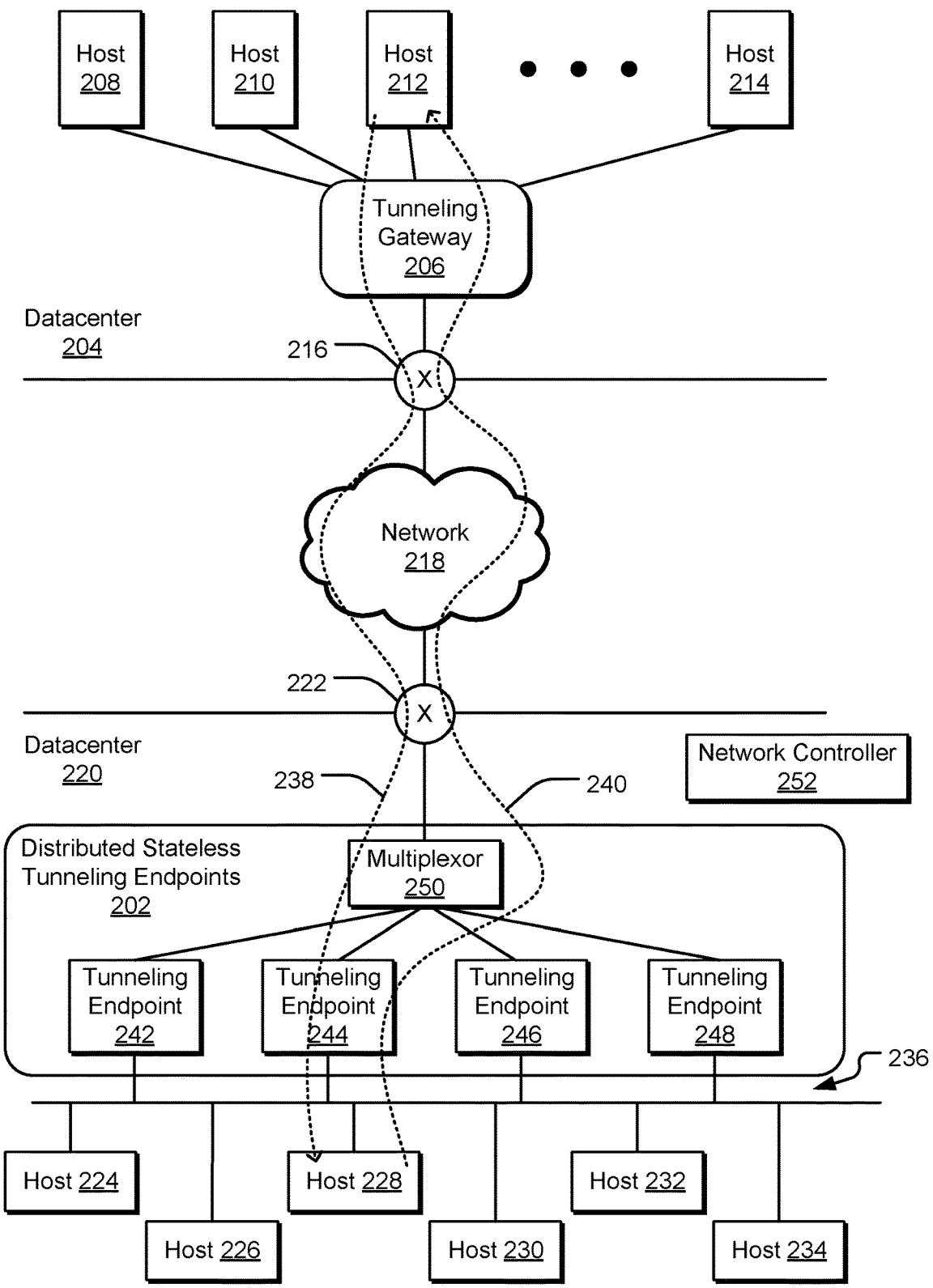
FIG. 2 illustrates an example system showing data flow through one or more distributed stateless tunneling endpoints.

FIG. 2 illustrates an example system 200 showing data flow through one or more distributed stateless tunneling endpoints 202. The system 200 includes a datacenter 204 that includes without limitation a tunneling gateway 206 and hosts 208, 210, 212, and 214. Such host processes may execute on one or more host computing devices within the datacenter 204. The datacenter 204 can transmit and receive data packets through a switch 216 across a network 218 to and from host processes (such as host 224, 226, 228, 230, 232 and 234) within the datacenter 220 using a stateless tunneling protocol, such as GRE or L3 routing. Such host processes may execute on one or more host computing devices within the datacenter 220.

An ingress path (with respect to the datacenter 220) is included in the data packet traffic shown by dotted arrow 238. The distributed stateless tunneling endpoints 202 receive, via the switch 222, stateless tunneling data packets from outside the datacenter 220. A multiplexor 250 receives the ingress data packet traffic and routes the traffic to appropriate distributed stateless tunneling endpoints 202, such as tunneling endpoints 242, 244, 246, and 248, within the datacenter 220. In one implementation the multiplexor 250 routes the stateless tunneling data packets to an appropriate tunneling endpoint within the distributed stateless tunneling endpoints 202 based on the stateless tunneling key, the inner address pair, and routing rules provided by the network controller 252.

For ingress data traffic, the distributed stateless tunneling endpoints 202 convert stateless tunneling data packets into datacenter data packets and routes them (for example, to the host 228) within the datacenter network 236 of the datacenter 220. In one implementation, the ingress conversion includes decapsulating the stateless tunneling header of a stateless tunneling data packet (e.g., removing the stateless tunneling key and the outer address pair) and encapsulating the data packet with the datacenter network key (e.g., a virtual network key). Such conversation is processed in a tunneling endpoint by a programmable packet filter based on transformation rules provided by the network controller 252.

In one implementation, a stateless tunneling data packet is received by a stateless tunneling endpoint as part of an ingress data packet traffic path. An example format for the GRE-type stateless tunneling data packet includes without limitation:

[outer Ethernet header|outer IP header|GRE header|inner IP header|inner payload]

The data packet is initially processed by the multiplexor 250 that routes the data packet to tunneling endpoint (e.g., the tunneling endpoint 244) in host computing device containing the customer virtual machine or the customer's IP endpoint matching the destination inner IP address (e.g., the address within the datacenter network 236). The GRE key in the GRE header+the outer IP header uniquely identifies the inner customer packet. After decapsulation, the inner customer packet is processed for delivery to the destination customer IP endpoint in the datacenter network 236. The network controller or some other entity (e.g., a process applying a static policy) supplies routing rules for the datacenter space address of the destination host computing device where the datacenter address space endpoint resides.

In one example, the multiplexor 250 looks up the destination host computing device on which the customer virtual machine executes. The multiplexor 250 then modifies the destination MAC address in the Ethernet header with the destination MAC address of the destination host computing device and replaces outer IP header and the GRE header above with the provider space IP header and the network virtualization encapsulation key (e.g., NvGRE or VxLAN with the Tenant Network Identifier—TNI/Virtual Subnet Identifier—VSID, which uniquely identifies the customer address space) to yield a data packet of the format:

[Ethernet header|outer Provider IP header|NvGRE/VxLAN header|inner IP header|inner payload].

A PPF at the destination host computing device (such as the destination host computing device executing the host 228) receives this converted packet, decapsulates the Ethernet header, the outer Provider IP header, and the NvGRE/VxLAN header, and adds the inner IP header with the inner payload to the customer IP endpoint (which could be on a virtual machine or a container).

In an alternative implementation, the multiplexor 250 can encapsulate the received GRE encapsulated packet with a provider IP header (instead of replacing) and send the newly-double-encapsulated data packet to the destination host computing device. The double-encapsulated data packet is received at the destination host computing device, where the VF strips off the outer headers and delivers the inner IP packet to the customer's IP endpoint.

An egress path (with respect to the datacenter 220) is included in the packet traffic shown by dotted arrow 240. The host 228 in this example, generates a datacenter data packet. A programmable packet filter converts the datacenter data packet into a stateless tunneling data packet and transmits the converted data packet out of the datacenter 220 via the switch 222. In one implementation, the egress path 240 can bypass the multiplexor 250, although other egress path options are contemplated. In one implementation, the egress conversion includes decapsulating the datacenter network key from the datacenter data packet and encapsulating the data packet with a stateless tunneling key. Such conversation is processed in a tunneling endpoint by a programmable packet filter based on transformation rules provided by the network controller 252.

In one implementation, the customer application (e.g., running in a virtual machine on a host computing device) bound to the customer IP endpoint sends out a datacenter data packet from either its container or a virtual machine in the datacenter network 236. The datacenter data packet is destined to an IP endpoint that is reachable through a tunnel (e.g., a GRE or VLAN tunnel). After the virtual machine sends out the datacenter data packet, a virtual switch on the host computing device executing this virtual machine or another tunneling endpoint within the datacenter network 236 can process the datacenter data packet. A programmable packet filter (PPF), such as a virtual filtering platform on a virtual switch, can be programmed by transformation policies from a network controller or by a static policy in various ways to route the datacenter data packet to the IP endpoint that is reachable through a tunnel.

In one example, the virtual switch of the tunneling endpoint looks up the destination in the transformation rules of the virtual switch and encapsulates the packet with the stateless tunneling key, an outer IP header from the provider address space or the Internet address space, and the Ethernet header with the destination MAC address (e.g., as belonging to the next hop or the switch's mac address used to route the outer IP packet). In this manner, the encapsulation process avoids going through a single endpoint, such as a bottleneck gateway device or function. Since all or many host computing devices that have a customer's virtual machine or container can be equipped with a virtual switch capable of such encapsulation right at the host, the encapsulation process can be distributed to multiple host computing devices.

Figure 3:
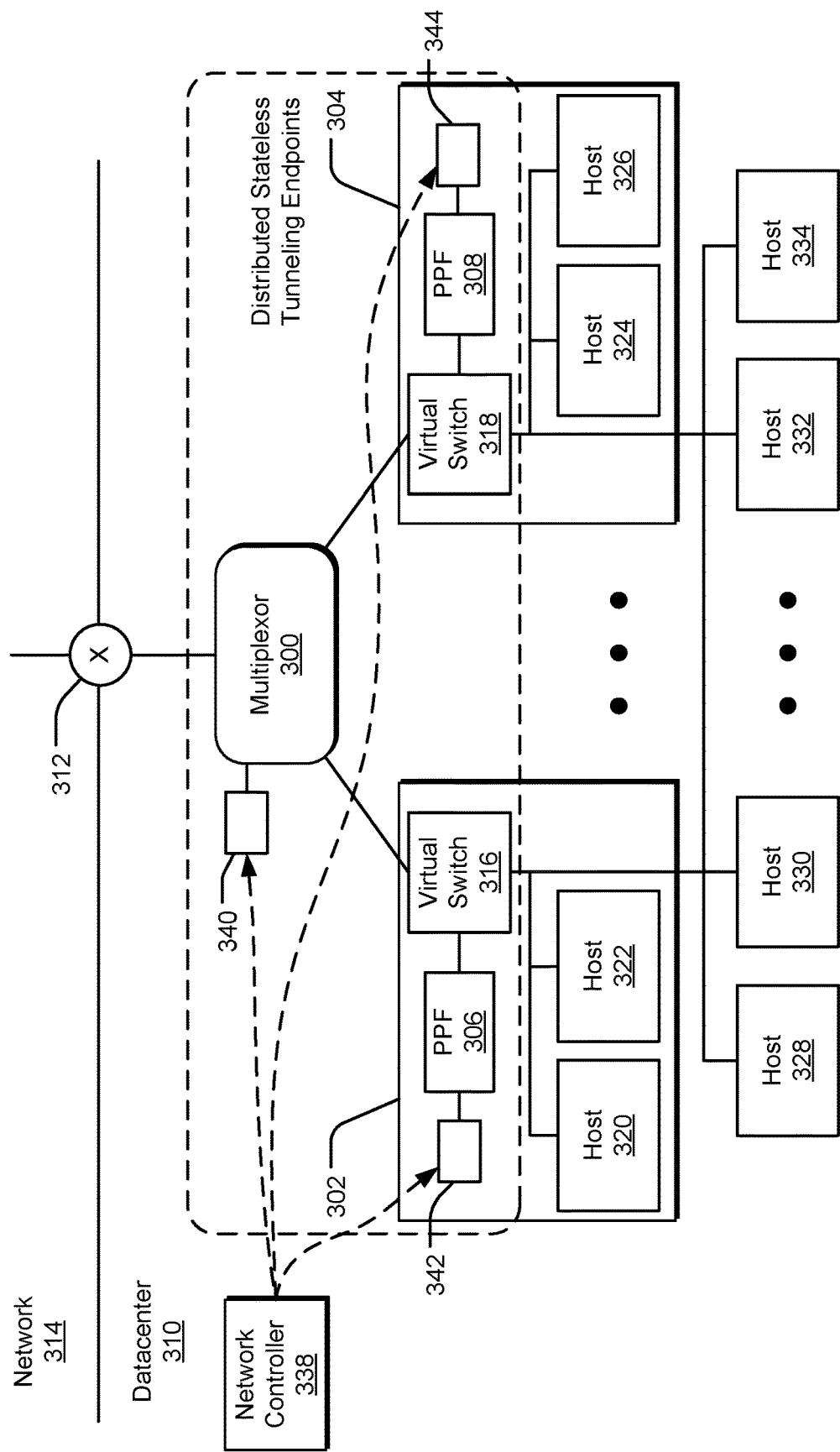
FIG. 3 illustrates a multiplexor and multiple example distributed stateless tunneling endpoints implemented as programmable packet filters executing on host computing devices.

FIG. 3 illustrates a multiplexor 300 and multiple example distributed stateless tunneling endpoints implemented as programmable packet filters (PPFs) 306 and 308 executing on host computing devices 302 and 304. Data packet traffic enters and leaves a datacenter 310 via a switch 312 communicatively coupled to a network 314.

Ingress data traffic is received as stateless tunneling data packets by the multiplexor 300, which routes the data packets to a selected one of the programmable packet filters of the distributed stateless tunneling endpoints (such as the PPF 306 of the host computing device 302) based on routing rules and on the inner address and a stateless tunneling key included within each stateless tunneling data packet. The routing rules are supplied to the multiplexor 300 by a network controller 338 and stored in a memory or storage device 340. In one implementation, the network controller 338 represents a centralized, programmable point of automation to manage, configure, monitor, and troubleshoot virtual and physical network infrastructure in the datacenter 310. As such, the network controller 338 can automate the configuration programming of the datacenter network infrastructure instead of requiring manual configuration of network devices and services.

The selected PPF converts the received stateless tunneling data packet into a datacenter data packets and transmits the datacenter data packet to a host within the datacenter network key of the datacenter 310, such as one of the hosts 320, 322, 324, 326, 328, 330, 332, 334, and 336, whether the host is executing in a virtual machine of the transmitting host computing device or another host computing device. The conversion from a stateless tunneling data packet to a datacenter data packet by the selected PPF is performed in accordance with transformation rules distributed to the PPFs by the network controller 338 and stored in a memory or storage device, such as storage devices 342 and 344.

In contrast, egress data traffic is received as datacenter data packets by the one of the PPFs, routed according to datacenter routing rules. The PPF converts the received datacenter data packet into a stateless tunneling data packet and transmits the converted data packet through the switch 312 into the network 314 outside the datacenter 310. In one implementation, this transmission can go directly to the switch 312 without traversing the multiplexor 300. The conversion from a datacenter data packet to a stateless tunneling data packet by the PPF is performed in accordance with transformation rules distributed to the PPFs by the network controller 338 and stored in a memory or storage device, such as storage devices 342 and 344.

In one implementation, the PPFs 306 and 308 may be implemented as a software plug-in to the virtual switches 316 and 318 of the host computing devices 302 and 304, respectively. In an alternative implementation, the PPFs may be implemented as a combination of hardware and firmware on network interface devices (referred to as a "NICs") in the host computing devices 302 and 304. In this manner, the PPFs can convert the received data packets without transitioning to virtual machine processing by the host computing device. Virtual machine processing introduces resource utilization and processor cycles that can be avoided if the data packet can be processed in the network interface device or an operating system/kernel-level virtual switch, thereby bypassing virtual machine processing during the conversion. Such non-virtual machine conversion can dramatically increase data traffic rates of stateless tunneling data packets.

Figure 4:
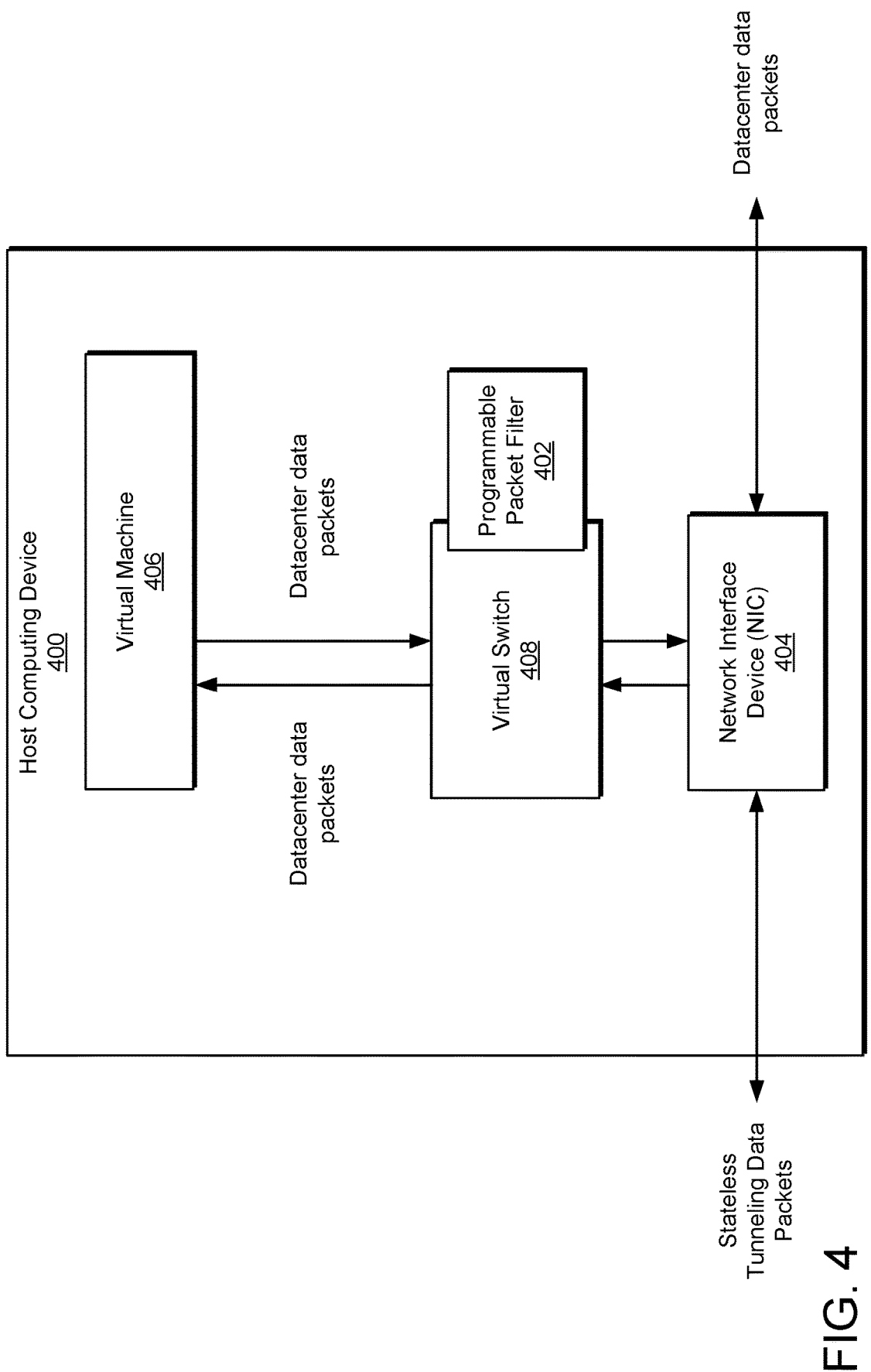
FIG. 4 illustrates an example host computing device executing a programmable packet filter.

FIG. 4 illustrates an example host computing device 400 executing a programmable packet filter 402. The host computing device 400 can execute multiple virtual machines (such as a virtual machine 406) and can further be communicatively coupled via a communications network to other host processes executing in virtual machines in other host computing devices. Within the datacenter, the communications network supports a datacenter network among multiple host computing devices. Hosts within the datacenter network are addressable using datacenter network addresses (e.g., private IP addresses within the datacenter).

Ingress data packets are received as stateless tunneling data packets by the network interface device 404, packet-processed (e.g., converted) by the programmable packet filter 402, and transmitted as datacenter data packets into the datacenter network, either to a host process executing in the virtual machine of the host computing device 400 (e.g., the virtual machine 406) or to an external host process executing on another host computing device.

Egress data packets are received within the datacenter network as datacenter data packets by the network interface device 404, whether from a host process executing in the virtual machine of the host computing device 400 (e.g., the virtual machine 406) or to an external host process executing on another host computing device. The programmable packet filter 402 packet-processes (e.g., converts) the datacenter data packets into stateless tunneling data packets, which are transmitted by the network interface device 404 through a top of rack switch into a network.

The programmable packet filter 402 may be implemented as a software plug-in to the virtual switch 408, with resides at an operating system/kernel-level within the host computing device 400, rather than within a virtual machine. The programmable packet filter 402 converts the data packets based on transformation rules provided by a network controller. By executing the programmable packet filter 402 outside any virtual machine processing in the host computing device 400 during the conversion, the data packet path during the conversion can avoid the resource and processing costs of transitioning into and out of a virtual machine on the host computing device 400.

Figure 5:
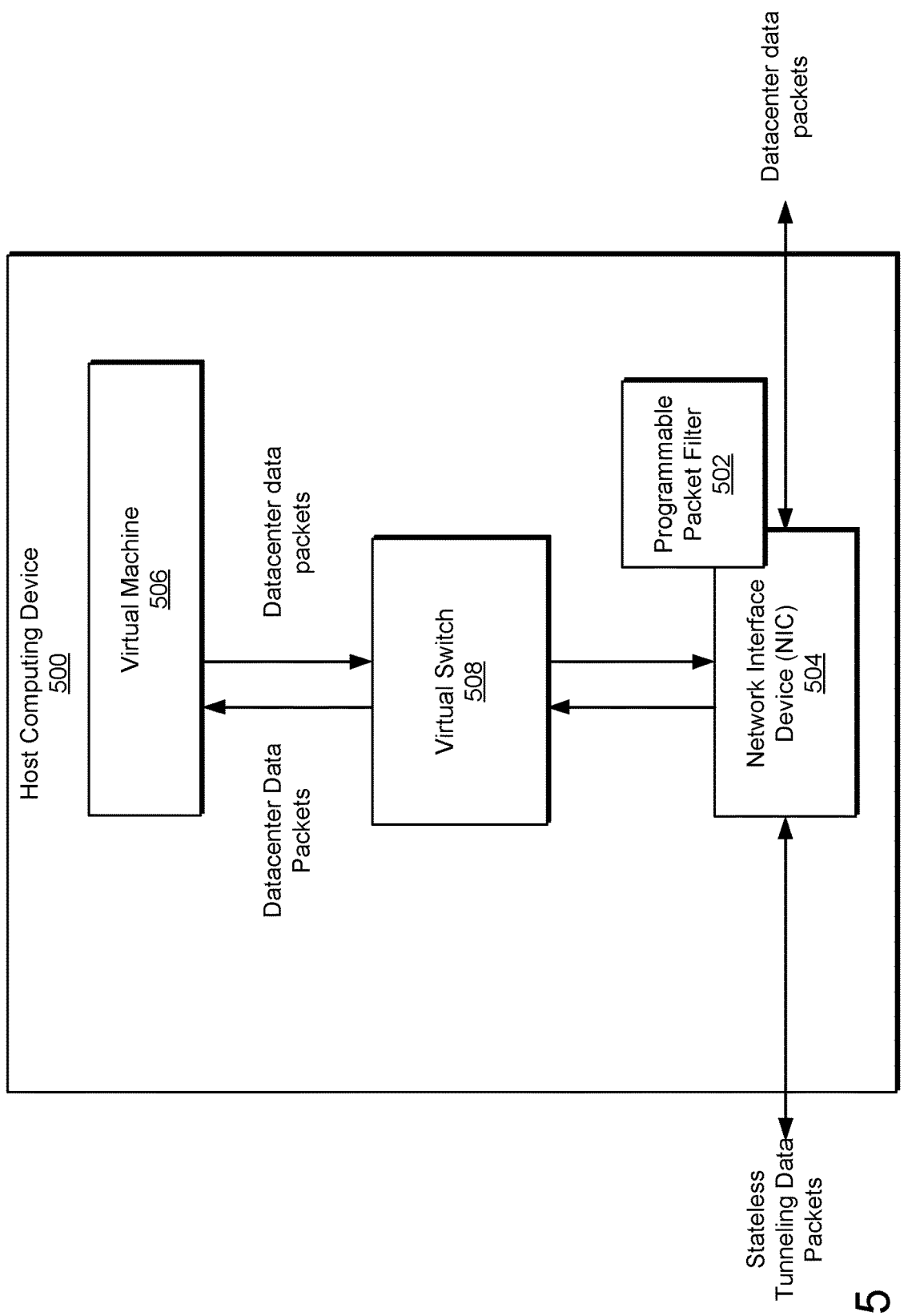
FIG. 5 illustrates an example host computing device executing a hardware-implemented programmable packet filter in a network interface device.

FIG. 5 illustrates an example host computing device 500 executing a hardware-implemented programmable packet filter 502 in a network interface device 504. The host computing device 500 can execute multiple virtual machines (such as a virtual machine 506) and can further be communicatively coupled via a communications network to other host processes executing in virtual machines in other host computing devices. Within the datacenter, the communications network supports a datacenter network among multiple host computing devices. Hosts within the datacenter network are addressable using datacenter network addresses (e.g., private IP addresses within the datacenter).

Ingress data packets are received as stateless tunneling data packets by the network interface device 504, packet-processed (e.g., converted) by the programmable packet filter 502, and transmitted as datacenter data packets into the datacenter network, either to a host process executing in the virtual machine of the host computing device 500 (e.g., the virtual machine 506) or to an external host process executing on another host computing device.

Egress data packets are received within the datacenter network as datacenter data packets by the network interface device 504, whether from a host process executing in the virtual machine of the host computing device 500 (e.g., the virtual machine 506) or to an external host process executing on another host computing device. The programmable packet filter 502 packet-processes (e.g., converts) the datacenter data packets into stateless tunneling data packets, which are transmitted by the network interface device 504 through a top of rack switch into a network.

The programmable packet filter 502 may be implemented as firmware or strictly as hardware (e.g., using a programmable gate array circuit) on the network interface device 504, which resides at or below an operating system/kernel-level within the host computing device 500, rather than within a virtual machine. The programmable packet filter 502 converts the data packets based on transformation rules provided by a network controller. By executing the programmable packet filter 502 outside any virtual machine processing in the host computing device 500 during the conversion, the data packet path during the conversion can avoid the resource and processing costs of transitioning through the virtual switch 508 and into and out of a virtual machine on the host computing device 500.

Figure 6:
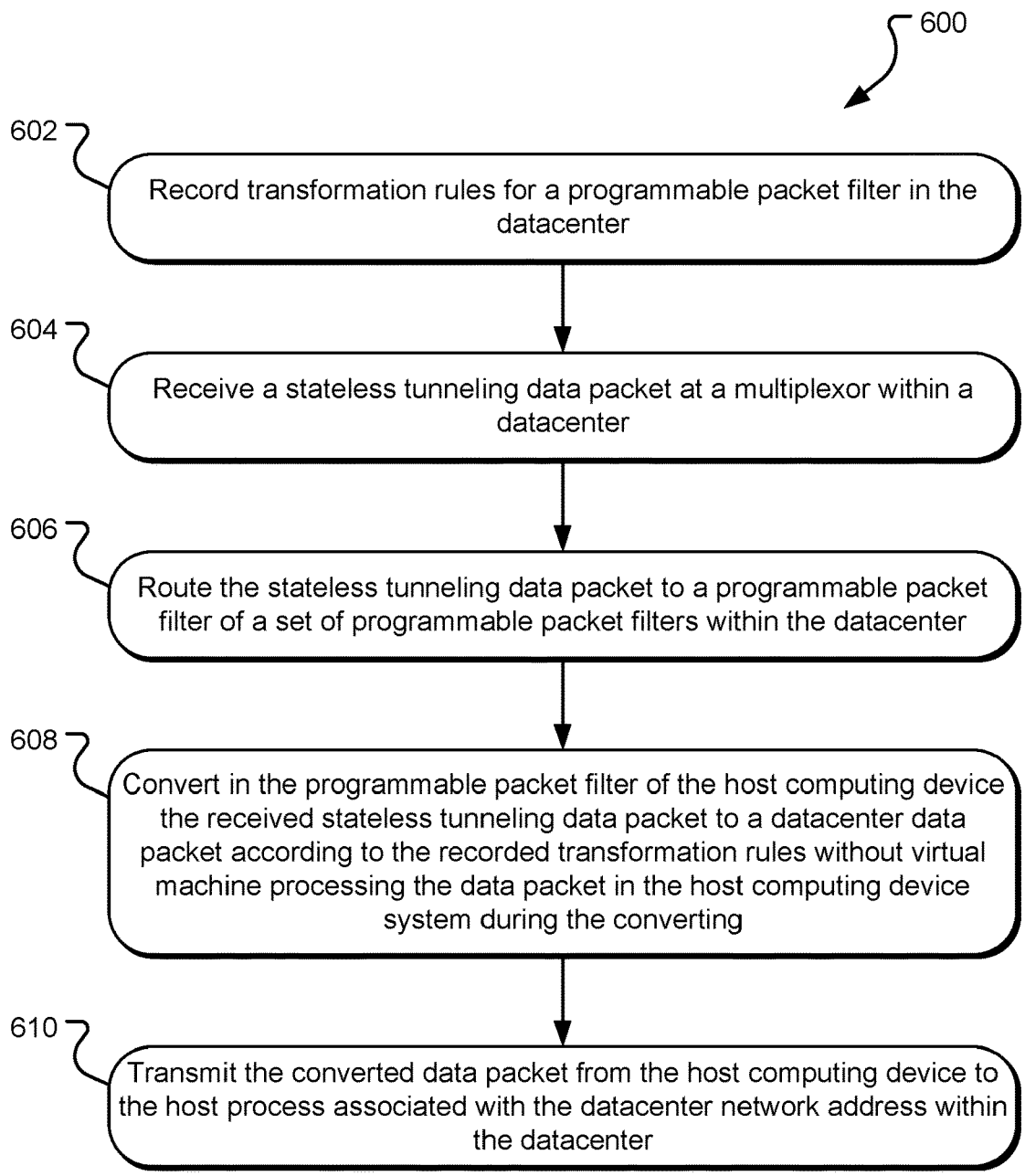
FIG. 6 illustrates example operations for implementing distributed stateless tunneling with an ingress data packet.

FIG. 6 illustrates example operations 600 for implementing distributed stateless tunneling with an ingress data packet. A recording operation 602 records transformation rules for a programming packet filter in a datacenter, such as in a memory device or storage device accessible by the programming packet filter. A receiving operation 604 receives a stateless tunneling data packet at a multiplexor within a datacenter. A routing operation 606 routes the stateless tunneling data packet to a programmable packet filter of a set of programmable packet filters within the datacenter. A converting operation 608 converts the stateless tunneling data packet into a datacenter data packet address for the datacenter network of the datacenter according to the recorded transformation rules. A transmitting operation 610 transmits the converted data packet from the programmable packet filter into the datacenter network based on a private network address associated with a host process within the datacenter network of the datacenter.

Figure 7:
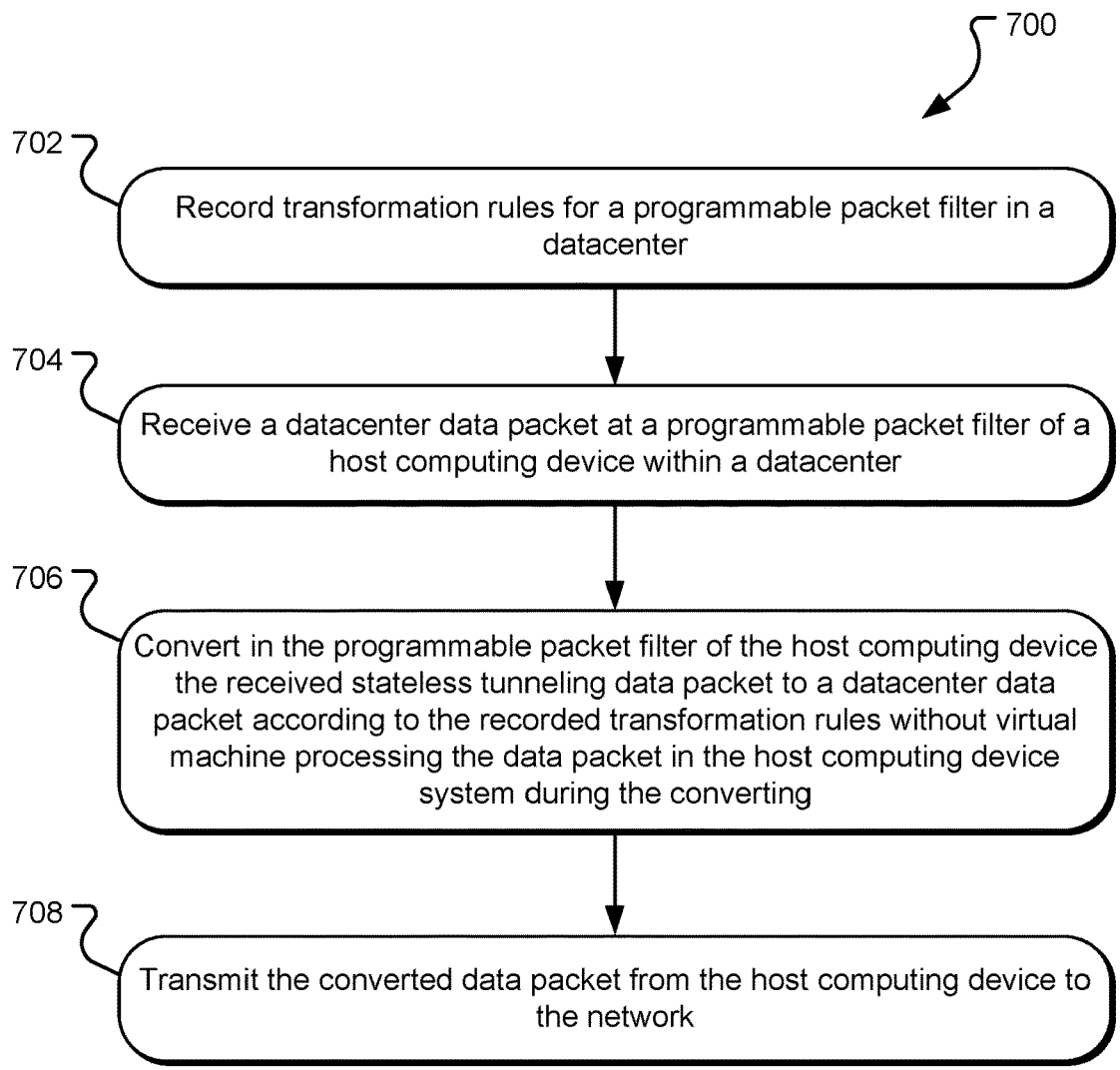
FIG. 7 illustrates example operations for implementing distributed stateless tunneling with an egress data packet.

FIG. 7 illustrates example operations 700 for implementing distributed stateless tunneling with an egress data packet. A recording operation 702 records transformation rules for a programming packet filter in a datacenter, such as in a memory device or storage device accessible by the programming packet filter. A receiving operation 704 receives a datacenter data packet at a programmable packet filter within a datacenter. A conversion operation 706 converts the datacenter data packet into a stateless tunneling data packet according to the recorded transformation rules. A transmitting operation 708 transmits the converted data packet from the programmable packet filter into a network.

Figure 8:
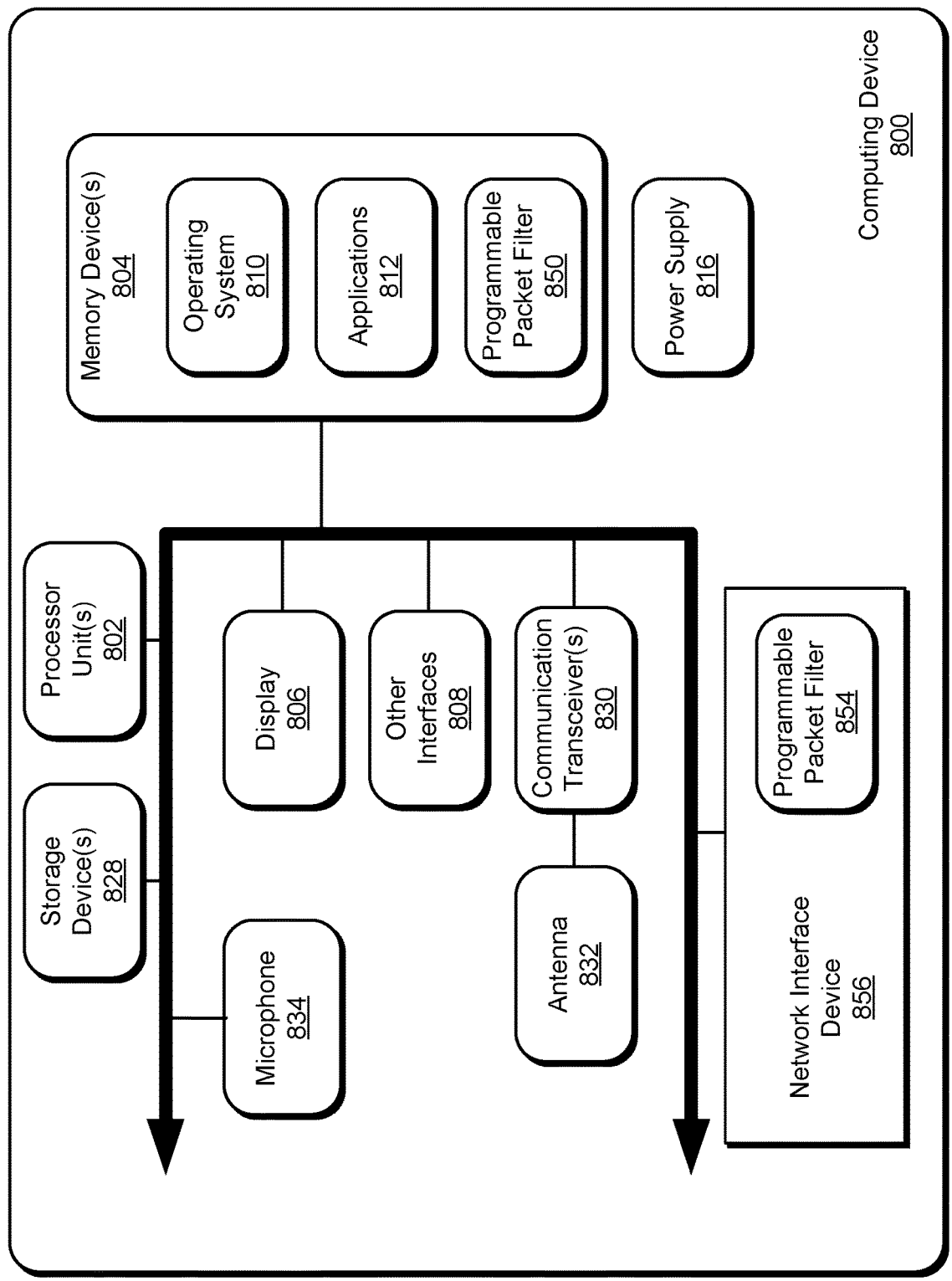
FIG. 8 illustrates an example computing device for use in implementing distributed stateless tunnels.

FIG. 8 illustrates an example computing device 800 for use in implementing distributed stateless tunnels. The computing device 800 includes one or more processor units 802, one or more memory devices 804, a display 806 (e.g., a touchscreen display or lights), a microphone 834, and other interfaces 808 (e.g., buttons). The memory device(s) 804 generally includes either or both of volatile memory (e.g., RAM) and non-volatile memory (e.g., flash memory). An operating system 810, such as the Microsoft Windows® operating system or the Microsoft Windows® Mobile operating system, resides in the memory 804 and is executed by the processor unit(s) 802, although it should be understood that other operating systems may be employed.

One or more applications 812 may be loaded in the memory device(s) 804 and executed on the operating system 810 by the processor unit(s) 802. A programmable packet filter 850 is also loaded into the memory device(s) 804 and executed by the processor unit(s) 802 or embedded on a network interface device (NIC). The computing device 800 includes a power supply 816, which is powered by one or more batteries or other power sources and which provides power to other components of the computing device 800. The power supply 816 may also be connected to an external power source that overrides or recharges the built-in batteries or other power sources.

The computing device 800 includes one or more communication transceivers 830 and an antenna 832 to provide network connectivity (e.g., a mobile phone network, Wi-Fi®, and Bluetooth®). The computing device 800 may also include various other components, such as a positioning system (e.g., a global positioning satellite transceiver), one or more accelerometers, one or more cameras, an audio interface (e.g., a microphone, an audio amplifier and speaker and/or audio jack), and one or more additional storage device(s) 828. Other configurations may also be employed.

In an example implementation, an operating system 810, one or more processor software drivers 850, various applications 812, a hypervisor, host processes, a virtual switch, a programmable packet filter 850, and other modules and services may be embodied by instructions stored in the memory device(s) 804 and/or storage device(s) 828 and processed by the processing unit(s) 802. Transformation rules, routing rules, and other data may be stored in memory device(s) 804 and/or storage device(s) 828 as persistent datastores. One implementation of a programmable packet filter 854 may be implemented as hardware or as a combination of hardware and firmware on a network interface device 856.

The computing device 800 may include a variety of tangible computer-readable storage media and intangible computer-readable communication signals, or alternatively, tangible processor-readable storage media and intangible processor-readable communication signals. Tangible computer-readable storage and tangible processor-readable storage can be embodied by any available media that can be accessed by the computing device 800 and includes both volatile and nonvolatile storage media, removable and non-removable storage media. Tangible computer-readable/processor-readable storage media excludes intangible communications signals and includes volatile and nonvolatile, removable and non-removable storage media implemented in any method or technology for storage of information such as computer/processor readable instructions, data structures, program modules or other data. Tangible computer-readable/processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 800. In contrast to tangible computer-readable/processor-readable storage media, intangible computer-readable/processor-readable communication signals may embody computer/processor readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible computer-readable/processor-readable storage medium to store logic. Examples of such a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer/processor program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example method of tunneling a data packet through a network communicatively connected to a datacenter is provided. The datacenter is uniquely addressed within the network. The datacenter has a different internal address space than the network. The example method records transformation rules for a programmable packet filter in the datacenter, receives the data packet in the programmable packet filter of a host computing device in the datacenter, and converts in the programmable packet filter of the host computing device the received data packet between a stateless tunneling data packet and a datacenter data packet according to the recorded transformation rules. The datacenter data packet is uniquely addressed within the internal address space of the datacenter. The received data packet bypasses any virtual machine processing in the host computing device during the converting. The example method also transmits the converted data packet from the programmable packet filter in the datacenter.

Another example method of any preceding method provides that the data packet is communicated through the network as a stateless tunneling data packet and received by the programmable packet filter in the datacenter. The stateless tunneling data packet includes a stateless tunneling key and an internal network address addressing a host process within the datacenter.

Another example method of any preceding method provides a transmitting operation that transmits the converted data packet from the programmable packet filter to the host process associated with the internal network address within the datacenter.

Another example method of any preceding method provides that the data packet is communicated through the network as a stateless tunneling data packet and received by a multiplexor, and further includes routing the stateless tunneling data packet to the programmable packet filter of a set of programmable packet filters within the datacenter based on an internal network address of the stateless tunneling data packet, prior to receiving the data packet in a programmable packet filter of the host computing device in the datacenter.

Another example method of any preceding method provides that the data packet is received as a datacenter data packet from a host process within the datacenter by the programmable packet filter, the datacenter data packet including a datacenter network key.

Another example method of any preceding method provides a transmitting operation that transmits the converted data packet from the programmable packet filter into the network with a stateless tunneling key and a network address addressing another datacenter on the network.

Another example method of any preceding method provides that the programmable packet filter is executed in a virtual switch of the host computing device, outside of virtual machine processing on the host computing device.

Another example method of any preceding method provides that the programmable packet filter is executed in a network interface device of the host computing device, outside of virtual machine processing on the host computing device.

An example system for tunneling a data packet through a network communicatively connected to a datacenter is provided. The datacenter is uniquely addressed within the network. The datacenter has a different internal address space than the network. A programmable packet filter executes in a host computing device and is programmed according to transformation rules distributed within the datacenter to convert the received data packet between a stateless tunneling data packet and a datacenter data packet. The datacenter data packet is uniquely addressed within the internal address space of the datacenter. The data packet bypasses any virtual machine processing in the host computing device during the converting. The example system includes a network interface device of a host computing device in a datacenter. The network interface device is configured to receive the data packet in the host computing device in the datacenter and to transmit the converted data packet from the programmable packet filter in the datacenter.

Another example system of any preceding system provides that the data packet is communicated through the network as a stateless tunneling data packet and received by the programmable packet filter in the datacenter. The stateless tunneling data packet includes a stateless tunneling key and an internal network address addressing a host process within the datacenter.

Another example system of any preceding system provides that the network interface device is configured to transmit the converted data packet from the programmable packet filter to the host process associated with the internal network address within the datacenter.

Another example system of any preceding system provides that the data packet is communicated through the network as a stateless tunneling data packet and received by a multiplexor, and further includes a multiplexor communicatively coupled to the network and the host computing device and configured to route the stateless tunneling data packet to the programmable packet filter of a set of programmable packet filters within the datacenter based on an internal network address of the stateless tunneling data packet, prior to reception of the data packet in a programmable packet filter of the host computing device in the datacenter.

Another example system of any preceding system provides that the data packet is received as a datacenter data packet from a host process of the datacenter by the programmable packet filter, the datacenter data packet including a datacenter network key.

Another example system of any preceding system provides that the network interface device is configured to transmit the converted data packet from the programmable packet filter into the network with a stateless tunneling key and a network address addressing another datacenter on the network.

Another example system of any preceding system provides that the programmable packet filter is executed in a virtual switch of the host computing device or a network interface device of the host computing device, outside of virtual machine processing on the host computing device.

One or more example tangible processor-readable storage media of a tangible article of manufacture encodes processor-executable instructions for executing on a computer system a process of tunneling a data packet through a network communicatively connected to a datacenter. The datacenter is uniquely addressed within the network. The datacenter has a different internal address space than the network. Transformation rules for a programmable packet filter are recorded in the datacenter. The data packet is received in the programmable packet filter of a host computing device in the datacenter. The received data packet is converted in the programmable packet filter of the host computing device between a stateless tunneling data packet and a datacenter data packet according to the recorded transformation rules. The datacenter data packet is uniquely addressed within the internal address space of the datacenter. The received data packet bypasses any virtual machine processing in the host computing device during the converting. The converted data packet is transmitted from the programmable packet filter in the datacenter.

Another one or more tangible processor-readable storage media of any preceding tangible processor-readable storage media provides that the data packet is communicated through the network as a stateless tunneling data packet and received by the programmable packet filter in the datacenter. The stateless tunneling data packet includes a stateless tunneling key and an internal network address addressing a host process within the datacenter. The transmitting operation includes transmitting the converted data packet from the programmable packet filter to the host process associated with the internal network address of the datacenter.

Another one or more tangible processor-readable storage media of any preceding tangible processor-readable storage media provides that the data packet is communicated through the network as a stateless tunneling data packet and received by a multiplexor in the datacenter. The process further includes routing the stateless tunneling data packet to the programmable packet filter of a set of programmable packet filters within the datacenter based on an internal network address of the stateless tunneling data packet, prior to receiving the data packet in the programmable packet filter of the host computing device in the datacenter.

Another one or more tangible processor-readable storage media of any preceding tangible processor-readable storage media provides that the data packet is received as a tunneling network data packet from a host process within the datacenter by the programmable packet filter. The datacenter data packet includes a datacenter network key, and the transmitting operation includes transmitting the converted data packet from the programmable packet filter into the network with a stateless tunneling key and a network address addressing another datacenter on the network.

Another one or more tangible processor-readable storage media of any preceding tangible processor-readable storage media provides that the programmable packet filter is executed in a virtual switch or a network interface device of the host computing device, outside of virtual machine processing on the host computing device.

An example system of tunneling a data packet through a network communicatively connected to a datacenter is provided. The datacenter is uniquely addressed within the network. The datacenter has a different internal address space than the network. The example system includes means for recording record transformation rules for a programmable packet filter in the datacenter, means for receiving the data packet in the programmable packet filter of a host computing device in the datacenter, and means for converting in the programmable packet filter of the host computing device the received data packet between a stateless tunneling data packet and a datacenter data packet according to the recorded transformation rules. The datacenter data packet is uniquely addressed within the internal address space of the datacenter. The received data packet bypasses any virtual machine processing in the host computing device during the converting. The example system also includes means for transmitting the converted data packet from the programmable packet filter in the datacenter.

Another example system of any preceding system provides that the data packet is communicated through the network as a stateless tunneling data packet and received by the programmable packet filter in the datacenter. The stateless tunneling data packet includes a stateless tunneling key and an internal network address addressing a host process within the datacenter.

Another example system of any preceding system provides that the means for transmitting transmits the converted data packet from the programmable packet filter to the host process associated with the internal network address within the datacenter.

Another example system of any preceding system provides that the data packet is communicated through the network as a stateless tunneling data packet and received by a multiplexor, and further includes means for routing the stateless tunneling data packet to the programmable packet filter of a set of programmable packet filters within the datacenter based on an internal network address of the stateless tunneling data packet, prior to receiving the data packet in a programmable packet filter of the host computing device in the datacenter.

Another example system of any preceding system provides that the data packet is received as a datacenter data packet from a host process within the datacenter by the programmable packet filter, the datacenter data packet including a datacenter network key.

Another example system of any preceding system provides that the means for transmitting transmits the converted data packet from the programmable packet filter into the network with a stateless tunneling key and a network address addressing another datacenter on the network.

Another example system of any preceding system provides that the programmable packet filter is executed in a virtual switch of the host computing device, outside of virtual machine processing on the host computing device.

Another example system of any preceding system provides that the programmable packet filter is executed in a network interface device of the host computing device, outside of virtual machine processing on the host computing device.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method of tunneling a data packet through a network communicatively connected to a datacenter, the datacenter being uniquely addressed within the network, the datacenter having a different internal address space than the network, the method comprising:

recording transformation rules for a programmable packet filter in the datacenter;

receiving the data packet in the programmable packet filter of a host computing device in the datacenter;

converting in the programmable packet filter of the host computing device the received data packet between a stateless tunneling data packet and a datacenter data packet according to the recorded transformation rules, the datacenter data packet being uniquely addressed within the internal address space of the datacenter, the received data packet bypassing any virtual machine processing in the host computing device during the converting; and transmitting the converted data packet from the programmable packet filter in the datacenter.

2. The method of claim 1, wherein the data packet is communicated through the network as a stateless tunneling data packet and received by the programmable packet filter in the datacenter, the stateless tunneling data packet including a stateless tunneling key and an internal network address addressing a host process within the datacenter.

3. The method of claim 2, wherein the transmitting operation comprises:

transmitting the converted data packet from the programmable packet filter to the host process associated with the internal network address within the datacenter.

4. The method of claim 1, wherein the data packet is communicated through the network as a stateless tunneling data packet and received by a multiplexor, and further comprising:

routing the stateless tunneling data packet to the programmable packet filter of a set of programmable packet filters within the datacenter based on an internal network address of the stateless tunneling data packet, prior to receiving the data packet in a programmable packet filter of the host computing device in the datacenter.

5. The method of claim 1, wherein the data packet is received as a datacenter data packet from a host process within the datacenter by the programmable packet filter, the datacenter data packet including a datacenter network key.

6. The method of claim 5, wherein the transmitting operation comprises:

transmitting the converted data packet from the programmable packet filter into the network with a stateless tunneling key and a network address addressing another datacenter on the network.

7. The method of claim 1, wherein the programmable packet filter is executed in a virtual switch of the host computing device, outside of virtual machine processing on the host computing device.

8. The method of claim 1, wherein the programmable packet filter is executed in a network interface device of the host computing device, outside of virtual machine processing on the host computing device.

9. A system for tunneling a data packet through a network communicatively connected to a datacenter, the datacenter being uniquely addressed within the network, the datacenter having a different internal address space than the network, the system comprising:

a programmable packet filter executing in a host computing device and programmed according to transformation rules distributed within the datacenter to convert the received data packet between a stateless tunneling data packet and a datacenter data packet, the datacenter data packet being uniquely addressed within the internal address space of the datacenter, the data packet bypassing any virtual machine processing in the host computing device during the converting; and a network interface device of a host computing device in a datacenter, the network interface device being configured to receive the data packet in the host computing device in the datacenter and to transmit the converted data packet from the programmable packet filter in the datacenter.

10. The system of claim 9, wherein the data packet is communicated through the network as a stateless tunneling data packet and received by the programmable packet filter in the datacenter, the stateless tunneling data packet including a stateless tunneling key and an internal network address addressing a host process within the datacenter.

11. The system of claim 10, wherein the network interface device is configured to transmit the converted data packet from the programmable packet filter to the host process associated with the internal network address within the datacenter.

12. The system of claim 9, wherein the data packet is communicated through the network as a stateless tunneling data packet and received by a multiplexor, and further comprising:

a multiplexor communicatively coupled to the network and the host computing device and configured to route the stateless tunneling data packet to the programmable packet filter of a set of programmable packet filters within the datacenter based on an internal network address of the stateless tunneling data packet, prior to reception of the data packet in a programmable packet filter of the host computing device in the datacenter.

13. The system of claim 9, wherein the data packet is received as a datacenter data packet from a host process of the datacenter by the programmable packet filter, the datacenter data packet including a datacenter network key.

14. The system of claim 13, wherein the network interface device is configured to transmit the converted data packet from the programmable packet filter into the network with a stateless tunneling key and a network address addressing another datacenter on the network.

15. The system of claim 9, wherein the programmable packet filter is executed in a virtual switch of the host computing device or a network interface device of the host computing device, outside of virtual machine processing on the host computing device.

16. One or more tangible processor-readable storage media of a tangible article of manufacture encoding processor-executable instructions for executing on a computer system a process of tunneling a data packet through a network communicatively connected to a datacenter, the datacenter being uniquely addressed within the network, the datacenter having a different internal address space than the network, the process comprising:

recording transformation rules for a programmable packet filter in the datacenter;

receiving the data packet in the programmable packet filter of a host computing device in the datacenter;

converting in the programmable packet filter of the host computing device the received data packet between a stateless tunneling data packet and a datacenter data packet according to the recorded transformation rules, the datacenter data packet being uniquely addressed within the internal address space of the datacenter, the received data packet bypassing any virtual machine processing in the host computing device during the converting; and transmitting the converted data packet from the programmable packet filter in the datacenter.

17. The one or more tangible processor-readable storage media of claim 16, wherein the data packet is communicated through the network as a stateless tunneling data packet and received by the programmable packet filter in the datacenter, the stateless tunneling data packet including a stateless tunneling key and an internal network address addressing a host process within the datacenter, and the transmitting operation comprises:

transmitting the converted data packet from the programmable packet filter to the host process associated with the internal network address of the datacenter.

18. The one or more tangible processor-readable storage media of claim 16, wherein the data packet is communicated through the network as a stateless tunneling data packet and received by a multiplexor in the datacenter, and the process further comprises:

routing the stateless tunneling data packet to the programmable packet filter of a set of programmable packet filters within the datacenter based on an internal network address of the stateless tunneling data packet, prior to receiving the data packet in the programmable packet filter of the host computing device in the datacenter.

19. The one or more tangible processor-readable storage media of claim 16, wherein the data packet is received as a tunneling network data packet from a host process within the datacenter by the programmable packet filter, the datacenter data packet including a datacenter network key, and the transmitting operation comprises:

transmitting the converted data packet from the programmable packet filter into the network with a stateless tunneling key and a network address addressing another datacenter on the network.

20. The one or more tangible processor-readable storage media of claim 16, wherein the programmable packet filter is executed in a virtual switch or a network interface device of the host computing device, outside of virtual machine processing on the host computing device.

* * * * *